United States Patent [19]

Lancaster et al.

[11] Patent Number: 4,787,194

[45] Date of Patent: Nov. 29, 1988

[54] RF-SEALABLE PACKAGING CONTAINERS

[75] Inventors: Gerald M. Lancaster, Surfside; David C. Kelley, Angleton, both of Tex.

[73] Assignee: The Dow Chemical Company, Midland, Mich.

[21] Appl. No.: 42,997

[22] Filed: Apr. 27, 1987

Related U.S. Application Data

[60] Division of Ser. No. 738,008, May 28, 1985, Pat. No. 4,660,354, and a continuation-in-part of Ser. No. 645,990, Aug. 31, 1984, Pat. No. 4,601,948, which is a continuation-in-part of Ser. No. 531,110, Sep. 12, 1983, Pat. No. 4,600,614.

[51] Int. Cl.[4] ............................................. B65B 7/02
[52] U.S. Cl. ..................................... 53/469; 53/479; 53/DIG. 2; 156/274.4; 219/10.41; 219/10.53; 219/10.81
[58] Field of Search ................... 53/469, 479, DIG. 2; 219/10.81, 10.41, 10.53, 10.55 R; 156/274.4, 379.6

[56] References Cited

U.S. PATENT DOCUMENTS

| | | | |
|---|---|---|---|
| 3,403,064 | 9/1968 | Bellamy | 156/274.4 |
| 3,725,189 | 4/1973 | Gidge | 156/274.4 X |
| 4,268,338 | 5/1981 | Peterson | 219/10.53 X |
| 4,339,295 | 7/1982 | Boretos et al. | 219/10.53 X |
| 4,637,199 | 1/1987 | Steck et al. | 156/274.4 X |
| 4,704,509 | 11/1987 | Hilmersson et al. | 219/10.53 |

OTHER PUBLICATIONS

"The Journal of Microwave Power and Electromagnetic Energy" vol. 22, No. 3, 1987.

*Primary Examiner*—James F. Coan
*Attorney, Agent, or Firm*—Walter J. Lee

[57] ABSTRACT

Packaging containers which are closed, except for a pinch-type filling valve or filling-opening, are provided with an RF-sealable polymer, at least in the valve or opening, in order to be able to seal the valve or opening using RF frequency. Preferably, polymers which are sealable using MW energy are used, including, preferably, carbon monoxide-containing ethylene polymers.

18 Claims, No Drawings

RF-SEALABLE PACKAGING CONTAINERS

CROSS-REFERENCE TO RELATED APPLICATION

This is a divisional, of application Ser. No. 738,008, filed May 28, 1985, now U.S. Pat. No. 4,660, 354, and a continuation-in-part of co-pending application Ser. No. 645,990 filed Aug. 31, 1984, now U.S. Pat. No. 4,601,948 which is, itself, a continuation-in-part of co-pending Ser. No. 531,110 filed Sept. 12, 1983, now U.S. Pat. No. 4,600,614.

FIELD OF THE INVENTION

Containers having filling-openings or pinch-type filler valves are provided with polymers which are RF-sealable in the pinch area.

BACKGROUND OF THE INVENTION

The use of high-frequency electromagnetic energy as a means of heating polymers is an advancing art which finds application in many fields, especially in fields in which conventional conductive, convective, or radiant heat energy is either not suitable, not practical, or not possible. For instance, sealing of a polymer to itself or to some other substrate can be (if the composition of the polymer is appropriate) an important commercial technique in producing a desired end-product.

There are some polymers which are not suitable, or at least not well-suited, for high-frequency heating operations. In such ill-suited polymers high-frequency heating either does not occur, or if it occurs it does so only after inefficiently prolonged periods of treatment time. In production assembly lines, e.g., a quick heat-seal operation is generally preferred over a prolonged heat-seal operation.

Among the polymers which are ill-suited for high-frequency heating are olefin polymers, e.g., polymers and copolymers of ethylene, propylene, styrene or other α-olefinically unsaturated hydrocarbons having about 2 to about 10 carbon atoms. Some of these olefin polymers may contain polar groups, or polarizable groups, due to the incorporation therein of, e.g., acrylic (or methacrylic) acids or their alkyl esters as comonomers with the olefins, and these groups may, at high levels of incorporation tend to impart a modicum of high-frequency heatability to the polymer, but the efficacy is generally so slight that it is infeasible on a commercial basis. Some polymers having polar groups, e.g. chlorinated P.E., ethylene/vinyl acetate copolymer, PVC, polyvinylidene chloride, and polyamide, are heatable under the influence of certain frequencies of electromagnetic radiation, but are not generally wellsuited for bonding using the higher frequencies.

Polyethylene is particularly known in the art to be substantially unsuitable for high-frequency heating unless sensitizers are added to the polymer; this is true regardless of whether it is linear or branched, or of whether it is low, medium, or high density (see, e.g., U.S. Pat. No. 3,336,173; 3,640,913; and 3,810,799).

There are various types of packaging containers which are substantially closed except for a filling-opening and which can be sealed by pinching the filling-opening to a closed position and providing a means for keeping it closed. This includes such containers as open-top bags, bags with pinch-valves, open-end tubes, and the like. Usually such containers are of multi-ply construction, at least in the area which is pinched shut after being filled.

It is an object of the present invention to provide ways and means for imparting high-frequency heatability to the pinch area of open-mouth containers (or bags), valve bags, and the like which have a filling-opening which is pinched shut after the container is filled and fastened in the closed condition.

SUMMARY OF THE INVENTION

Open-mouth pinch-type bags, or valve bags or containers are provided with a layer of dielectrically-active polymer, at least in the valve structure or pinch area, to provide for RF-sealing of the bags or containers. Polymers or resins having dielectric properties are operable at certain frequencies, such as ethylene copolymers having pendant reactive groups, olefin polymers having pendant halogen groups, nylons, and carbon monoxide-containing ethylene polymers. For the higher frequencies above about 100 MHz, especially microwave frequencies, it is preferred to use the carbon monoxide-containing ethylene polymers, such as E/CO, E/CO/VA, E/CO/AA, or E/CO/MAA, most especially the E/CO, E/CO/AA, or E/CO/MAA polymers. Containers other than bags can also be used if there is a pinch area which, when sealed, closes the container.

DETAILED DESCRIPTIONS

The preparation of olefin polymers, copolymers, and terpolymers is well known and the methods and techniques are well known to practitioners of the relevant polymer art. For the most part, the olefin copolymers and terpolymers of interest in this present disclosure are prepared by the well known high pressure, high temperature, free-radical initiated, polymerization method such as the historically-popular ICI process or such as disclosed in U.S. Pat. No. 2,497,323. However, those polymerization processes which employ certain of the coordination catalysts or metal catalysts (e.g., the well-known Ziegler-type, Natta-type, or Phillips-type) may be used by selecting a catalyst (such as in U.S. Pat. No. 3,083,184) which is not easily poisoned or deactivated by carbon monoxide, or other oxygen-containing monomer, which is generally highly reactive with many metal-carbon bonds.

Olefin polymers within the purview of this invention, and which are rendered heatable (by high-frequency electromagnetic radiation) by incorporating carbon monoxide groups into the polymer chain, are polymers formed by polymerizing monomers having ethylenic (olefinic) unsaturation. A sole olefin or a plurality of olefins may be used along with the carbon monoxide in preparing the polymers. Preferably the olefin monomer is ethylene (sometimes including a small proportion of a $C_3$-$C_8$ aliphatic olefin for property modification). The olefin monomer can also include an unsaturated organic acid having 3 to 8 carbon atoms, such as acrylic acid, methacrylic acid, 1-butenoic acid, and the like; alkyl esters or metal salts of these acids may also be used, such as ethyl acrylate, methyl methacrylate, 2-ethyl hexyl acrylate, sodium acrylate, potassium methacrylate, and the like. Hydrogenated CO-containing olefin polymers (which creates HC-OH groups along the polymer chain) are included here, such as hydrogenated ethylene/carbon monoxide copolymers. U.S. Pat. No. 2,495,292 discloses methods of hydrogenating such CO groups in a polymer chain.

It has been known for many years that olefins, e.g. ethylene, and carbon monoxide, can be copolymerized or terpolymerized.

The following listed patents are believed to be representative of the art pertaining to interpolymers of carbon monoxide and monoolefins: U.S. 2,495,292; 2,495,286; 2,497,323; 2,641,590; 3,083,184; 3,248,359; 3,530,109; 3,676,401; 3,689,460; 3,694,412; 3,780,140; 3,835,123; 3,929,727; 3,948,832; 3,948,873; 3,948,850; 3,968,082; 3,984,388; 4,024,104; 4,024,325; 4,024,326; 4,139,522; 4,143,096; 4,304,887; and Canadian Pat. No. 471,169.

It is also known that there are additives (sensitizers) which can be blended into a polymer, e.g. polyethylene, to render it heatable by electromagnetic high-frequency energy, such as talc, $ZnCl_2$, carbon black, nylon, iron oxide, and others. Such additives, however, usually have a pronounced visual, physical, or chemical effect which, in some applications, is desirably avoided. Furthermore, when using additives as sensitizers one is faced with having to obtain a uniform distribution of the sensitizers in order to avoid "hot-spots" which can give irregular results and may even damage the polymer.

It is within the purview of one aspect of the present inventive concept to create high-frequency sensitizer groups along the polymer chain in polymers which otherwise would be ill-suited for high-frequency heating. In this invention one does not encounter untoward visual effects in the polymer as a result of the sensitizer. Even in the present embodiments wherein a polymer of the present invention is blended with polymer (e.g., as a "masterbatch") in order to sensitize the whole, the polymers are generally compatible to an extent at which little or no visual effects are encountered. Thus, clear films of olefin polymers can be prepared, in accordance with the present invention, which are readily heat-sealed using high-frequency energy. It is especially of importance that the present invention provides polymers which are heatable by the action of microwave (MW) energy, a particular portion of the high-frequency energy range, thereby helping to fill a need in the industry where there is a sparsity of polymers which are suitable. The amount of CO groups in the ethylene interpolymers should be in the range of about 0.1 to about 50% by weight, preferably about 1 to about 40% by weight, most preferably about 5 to about 30% by weight.

As used herein "high-frequency sealability" refers to the bonding of the sealable polymer to a portion of itself or to another material using electromagnetic energy frequencies of 0.1-30,000 MHz. This includes radio-frequency (RF) heating and microwave (MW) heating in contradistinction to conventional heat sealing. The high-frequency range is generally taken to include electromagnetic waves over a broad frequency range (0.01 to 30,000 MHz) and covers the ultrasonic frequency range (18 KHz-1000 KHz), the radio frequency (RF) range (1 MHz-300 MHz), and the microwave (MW) frequency range (300 MHz-10,000 MHz). The RF and MW ranges are of particular interest here, with special interest in the MW range due to the increasing use of MW as a processing device.

Uses for this technology (polymer or blends) includes packaging applications where high speed seals are required, e.g., high-frequency activated adhesive films; extrusion coatings; moldings; hot melts in uses such as aseptic packaging, retort pouches, sandwich bags; lamination of foam, fabric, or film layers; powder moldings, and the like. Furthermore, the present invention provides polymers suitable for use in RF extruders, including continuous extruders or batch extruders. Wire and cable coatings can be applied in a continuous RF-extruder by the present invention.

In one aspect, this invention relates to an improved method of rendering a polymer which is not heatable of sealable utilizing high-frequency (0.1–30,000 MHz) electromagnetic radiation (HF) (e.g., polyethylene, polypropylene, polystyrene, etc.) HF-sealable by either incorporation of carbon monoxide by copolymerization or by blending or grafting a carbon monoxide copolymer or terpolymer into the polymer matrix. Hydrogenated forms of the above can also be used. In addition, ethylene/carbon monoxide copolymer (ECO) and interpolymers containing CO can be used for microwave sealing applications (i.e., microwave sealable plastic bags, toothpaste tube sealing, shampoo tube sealing, other microwave sealable containers, valve bag sealing, etc.). We have unexpectedly found that ECO copolymers and interpolymers convert high-frequency electromagnetic radiation into heat for sealing, welding or fusing over a broad frequency range (0.1–30,000 MHz). Typically, ethylene copolymers may be heatable to some extent at low RF frequencies of 1-50 MHz (radio frequency range is typically considered to be from 1-300 MHz; microwave frequency range is 300-30,000 MHz) such as ethylene/vinyl acetate copolymer (EVA), but none have been found which efficiently heat at the higher frequencies. Other examples of polymers heatable at low frequencies, but which do not efficiently heat at the higher frequencies are polyvinyl chloride (PVC), polyvinylidene chloride, chlorinated polyethylene (CPE), and Nylon 6.

The advantages of sealing polymers with high-frequency electromagnetic waves include faster and more efficient sealing, sealing through poor heat-conductors, e.g., paper or cardboard exteriors, stronger seals or bonds, improved economics based on efficient use of energy input, the ability to seal, bond, or laminate larger surface areas, sealing of thicker or more complex film laminates and specific sealing.

The general heating rate for the interaction of an electromagnetic wave can be used to determine sealing rates utilizing the following equation:

$$G = 13.3 \times 10^{-14} f F^2 (E' \tan \beta)$$

where G is the heating rate in cal/cm$^3$·sec, f is the frequency in Hz of the electromagnetic wave, F$^2$ is the field strength or power in volts/cm, E' is the dielectric constant of the polymer and tan $\beta$ is the dielectric loss tangent (measure of the heating property of the material when exposed to HF electromagnetic waves). Thus, in general (since tan $\beta$ varies with frequency) the higher the frequency the higher the heating rate or the faster the sealing ability of the material. The carbon monoxide (CO) containing interpolymers can be sealed or heated over a broad frequency range which allows one to have the option of using microwave frequencies for optimum speed in heating or sealing. This feature (heating or sealing over such a broad frequency) appears to be unique to these interpolymers or copolymers containing CO.

There are also advantages of CO copolymers or interpolymers over other polymers (e.g., PVC, PVDC, CPE, EVA), that are sealable using radio frequency sealing methods which include, for example:

1. ECO is like conventional low density polyethylenes in physical properties and film appearance, i.e., higher melting point, low film blockage, easy processability, can be used for film, extrusion coating and molding resin. Furthermore, the need for plasticizers is obviated.

2. CO can be copolymerized with ethylene and vinyl acetate to produce a CO-modified EVA polymer to render it more sealable and broadens the sealing frequency range. CO can also be copolymerized into an EAA or EMAA polymer allowing an EAA-like or EMAA-like terpolymer to be RF and microwave sealable (EAA and EMAA are not RF or microwave sealable). This includes the metal salts or "ionomer-type" embodiments of these polymers.

3. CO-containing copolymers or interpolymers have higher dielectric constants than EVA copolymers, allowing higher field strengths to be used without the fear of arcing.

EXAMPLE 1

The following Table I shows the time required to melt a polymer in a microwave oven (Sears Microclassic microwave oven) at maximum power (brought 275 ml of water to boil in 2.48 minutes).

TABLE I

| Resin* | MI*** | Melt Time (sec)** |
|---|---|---|
| ECO | | |
| 10% CO | 1 | 37 |
| 10% CO | 10 | 35 |
| 5% AA; 10% CO | 10 | 75 |
| 5% AA; 10% CO | 3.5 | 85 |
| 5% AA; 5% CO | 3 | 90 |
| 1% CO | 1 | 90 |
| EVA (14% VA) | wax | >10 min |
| EAA (12% AA) | wax | >10 min |
| Oxidized (PE) | wax | >10 min |
| E/vinyl alcohol | — | 42 |
| EVA/CO (20% CO) | — | 25 |
| EVA | | |
| 28% VA | 3.5 | >10 min |
| 18% VA | 3.0 | >10 min |
| EAA | | |
| 20% AA | 300 | >10 min |
| 30% AA | 1250 | >10 min |
| HDPE (0.965 dens.) | .8 | >10 min |
| LDPE (0.918 dens.) | 6 | >10 min |
| LLDPE (0.918 dens.) | 6 | >10 min |
| Nylon ®-6 resin (dried) | — | >10 min |
| Saran ® B-2000 polymer | — | >10 min |
| Chlorinated P.E. (CPE) | — | >10 min |

*Samples were 2" discs of 60 mil thickness, positioned on a non-RF sensitive polycarbonate sheet.
**If no melting was evident in 10 minutes, the test was stopped and reported as >10 min.
***MI is melt index in accordance with ASTM D-1238.
® Registered tradenames As can be seen from Table I, only ethylene/vinyl alcohol polymer and ethylene interpolymers containing carbon monoxide melted in the microwave oven (2450 MHz).

EXAMPLE 2

In order to determine the RF-sealability of carbon monoxide containing copolymers, a Callanan 1½ KW high-frequency electronic generator equipped with a 3/32"(0.24 cm)×12"(30.5 cm) brass sealing electrode and operating over a frequency range of 20–40 MHz (RF) was utilized in the following sealing experiment. Samples of 3 mil (0.076 mm) blown film of the copolymers shown in Table II were attempted to be sealed using the above RF sealer utilizing various dwell settings (sealing time) and power settings. The seals were examined and a seal was considered to have been made when the two sheets of material could not be separated at the seal point without tearing either piece of film. Table II also shows the improvement in minimum sealing time and resistance to arcing of CO containing copolymers in comparison to EVA copolymers.

TABLE II

| RADIO FREQUENCY SEALABILITY | | | |
|---|---|---|---|
| Resin | Power Setting | Dwell Time sec. | Sealability |
| EVA (9.3% VA, 2 MI) | 90 | 3 | No |
| | 100 | 3 | No |
| | 100 | 4 | Arc* |
| EVA (18% VA, 2.5 MI) | 10 | 1 | No |
| | 40 | 2 | No |
| | 70 | 2 | Yes |
| | 60 | 2 | Yes |
| | 70 | 1 | No |
| | 80 | 1 | Yes |
| | 90 | 2 | Arc |
| EVA (12.0% VA, 2.5 MI) | 60 | 2 | No |
| | 70 | 2 | No |
| | 80 | 2 | No |
| | 90 | 2 | Yes |
| | 100 | 1 | Arc |
| EVA (25% VA, 2 MI) | 30 | 2 | Yes |
| | 20 | 2 | No |
| | 60 | 1 | Yes |
| | 60 | .5 | No |
| | 70 | .5 | No |
| | 80 | .5 | Arc |
| EVA (28% VA, 3.0 MI) | 40 | 2 | Yes |
| | 20 | 1 | Yes |
| | 70 | .5 | Yes |
| | 80 | .25 | Arc |
| | 80 | .5 | Arc |
| ECO (10% CO, 1 MI) | 50 | 2 | No |
| | 60 | 2 | No |
| | 70 | 2 | Yes |
| | 100 | 1 | Yes |
| | 90 | 1 | Yes |
| | 80 | 1 | No |
| | 100 | .5 | Yes |
| | 90 | .5 | No |
| E/AA/CO (5% AA, 10% CO, 3.5 MI) | 70 | 2 | Yes |
| | 60 | 2 | Yes |
| | 50 | 2 | Yes |
| | 70 | 1 | Yes |
| | 60 | 1 | Yes |
| | 70 | .5 | Yes |
| | 60 | .5 | No |
| | 80 | .25 | No |
| | 90 | .25 | Yes |
| E/AA/CO (5% AA, 10% CO, 10 MI) | 70 | .5 | Yes |
| | 80 | .5 | Yes |
| | 80 | .25 | No |
| | 90 | .25 | Yes |

*Arc results in a hole burned through the film.

Within the purview of the present invention, useful articles are prepared which utilize the high-frequency electromagnetic radiation heatability and sealability of the above described CO containing olefin polymers. Layers or plies of these polymers are used as a means for sealing or bonding materials which are not, themselves, efficiently suitable for high-frequency electromagnetic radiation sealing or bonding. Various substrates, including particles, films, sheets, blocks. rods, spheres, and the like can be coated, at least in the area desired to be bonded, with these subject polymers and then sealed or bonded together using high-frequency electromagnetic radiation, especially those frequencies in the microwave range. These polymers, in the form of powders or particles, may be extruded into useful shapes, or as coatings onto other materials (e.g. wire and cable coatings), using high-frequency electromagnetic radiation as the heating means.

Novel adhesives comprising terpolymers of ethylene/carbon monoxide/carboxylic acid are prepared as embodiments in accordance with the present invention. The carboxylic acid moiety of the terpolymer may be any of the unsaturated carboxylic acid which are polymerizable through the double-bond, such as acrylic acid, methacrylic acid, crotonic acid, 1-butenoic acid, and the like, especially acrylic acid or methacrylic acid, most especially acrylic acid, including salts of these acids, such as metal salts, especially Na or K salts, commonly known as "ionomer" salts. The preparation of these E/CO/acid terpolymers may be done in the same manner as the E/acid copolymers as disclosed in U.S. Pat. Nos. 3,520,861 and 4,351,931. These patents disclose the use of a high pressure stirred autoclave reactor, using a free-radical initiator, to prepare uniform, random ethylene/carboxylic acid copolymers. Whereas these terpolymers can also be made by grafting techniques, by block polymerization techniques, in batch reactors, or in long tube reactors, it is preferred that the above disclosed stirred autoclave reactors be used whereby substantially uniform, random terpolymers are made.

Even though E/AA copolymers are generally regarded as having good adhesive properties with many substrates, as compared to polyethylene, there are some substrates where improved adhesion is desirable. Notable among these substrates, where improved adhesion is desirable, are polyamides (e.g. nylons), polyolefins (e.g. LDPE, HDPE, LLDPE, PP, OPP, polyisoprene), fluoropolymers (e.g. PTFE), polyethylene terephthalate (PET), metals (e.g. steel and aluminum foil), some paper-type products (e.g. glassine, kraft paper, etc.), cured epoxy resins, ethylene/vinyl alcohol copolymers, cured novolac resins, polyurethanes, polycarbonates, chloropolymers (e.g. polychloroprene, PVC, polyvinylidene), and inorganic substrates (e.g. glass and porcelain).

Conversely, whereas ECO copolymers exhibit a modicum of heat-activated or heat-induced adhesive properties to some substrates, it has been determined that the present E/CO/acid terpolymers exhibit greater adhesiveness in such instances, especially to such substrates as SARAN polymer and polycarbonate (where ECO has some adhesiveness) and to ethylene/vinyl alcohol copolymers, nylon, and aluminum (where ECO exhibits little or no adhesiveness).

The adhesive properties of these E/CO/acid terpolymers may be utilized by any convenient method, such as by hot-melt application, by post-heating of the adhesive in-situ on the substrate, by application of the adhesive in a carrier, such as in a solvent or as a dispersion in an aqueous carrier or in a non-solvent. The adhesive may be used in joining substrates of similar or dissimilar materials. As mentioned hereinbefore, these terpolymers are also suitable for use as films or as other materials and have the beneficial property of being high-frequency heatable, especially at those frequencies which are in, or near, the microwave range.

These E/CO/acid terpolymers are quite similar in optics and physical properties to EAA copolymers made by the same process. Insofar as these novel adhesive terpolymers are concerned, the ranges of the comonomer ingredients are as follows:

| | Weight % of Terpolymer | | |
|---|---|---|---|
| Monomer | Operable | Preferred | Most Preferred |
| Ethylene | 20–98 | 40–98 | 60–96 |
| Carbon Monoxide | 1–40 | 1–30 | 2–20 |
| Carboxylic Acid | 1–40 | 1–30 | 2–20 |

The melt index (M.I.), also called melt flow rate, as measured in accordance with ASTM D-1238, is preferably in the range of about 0.5 to about 2500, most preferably in the range of about 1 to about 60, even more preferably in the range of about 1 to about 20.

These E/CO/acid terpolymers are thermoplastic and can be thermoformed into films, sheets, tubes, or other articles. Powders of these terpolymers can be compression molded into sintered forms or the powders can be applied to the surface of a substrate where it can be heat-plastified to provide an adhesive layer or coating on the substrate or between two substrates. A film, strip, or sheet of these terpolymers can be placed between two substrates and heat-plastified to serve as an adhesive or laminate layer to hold the substrates together.

The following examples illustrate certain embodiments of the E/CO/acid terpolymers, compared with other polymers, but the invention is not limited to the specific embodiments shown.

EXAMPLE 3

The examples shown in Table III below are produced by compression molding at pressures and temperatures conducive to heat fusion. The resin samples to be tested for adhesion are first compression molded into 20 mil (0.5 mm) plaques and then laminated to the substrate (a film or plaque) to test for adhesion to the substrate. The adhesive of ethylene/carbon monoxide/acrylic acid terpolymers, E/CO/AA, is shown in comparison to low density polyethylene, LDPE; ethylene/acrylic acid copolymer; E/AA; ethylene/vinylacetate copolymer, E/VA; ethylene/carbon monoxide copolymer, E/CO; and ethylene/carbon monoxide/vinyl acetate terpolymer, E/CO/VA. The good adhesiveness obtainable with E/CO/AA terpolymers to the various substrates is evident, especially with nylon (a polyamide) and with polycarbonate which generally do not form strong bonds with most heat-plastified adhesives.

TABLE III

| | COMPRESSION MOLDED ADHESION VALUES (lbs/in) | | | | | | | | | |
|---|---|---|---|---|---|---|---|---|---|---|
| | PERCENT COMONOMER WITH ETHYLENE | | | | SUBSTRATE | | | | | |
| ADHESIVE | AA | CO | VA | MI | A[1] | B[2] | Nylon[3] | Aluminum[4] | EVAL[5] | Polycarbonate[6] |
| LDPE | — | — | — | — | .01 | .01 | .01 | .05 | .01 | .01 |
| E/AA Copolymer | 6.2 | — | — | 3.02 | .01 | .02 | 2.4 | 18.1 | .50 | .05 |
| E/AA Copolymer | 9.8 | — | — | 9.6 | .01 | .01 | 3.8 | 29.2 | .70 | .08 |
| E/AA Copolymer | 9.0 | — | — | 3.6 | .01 | .01 | 4.2 | 27.4 | .50 | .08 |
| E/VA Copolymer | — | — | 28.5 | 5.8 | 7.5 | 6.3 | 5.4 | 2.1 | 3.1 | .08 |

TABLE III-continued

| ADHESIVE | PERCENT COMONOMER WITH ETHYLENE | | | | COMPRESSION MOLDED ADHESION VALUES (lbs/in) SUBSTRATE | | | | | |
|---|---|---|---|---|---|---|---|---|---|---|
| | AA | CO | VA | MI | A[1] | B[2] | Nylon[3] | Aluminum[4] | EVAL[5] | Polycarbonate[6] |
| E/VA Copolymer | — | — | 6.5 | 1.11 | .04 | .10 | 6.44 | 8.9 | 6.8 | .05 |
| E/CO/AA Terpolymer | 5.0 | 5.0 | — | 56.1 | >10.47 | >2.39 | 1.83 | 18.0 | 3.1 | 7.5 |
| E/CO/AA Terpolymer | 5.0 | 10.0 | — | 4.3 | 11.8 | >1.89 | 9.88 | 16.0 | 7.5 | >10.4 |
| E/CO/AA Terpolymer | 5.0 | 10.0 | — | 18.7 | 9.0 | >4.2 | >23.2 | 22.5 | 7.9 | >10.4 |
| E/CO Copolymer | 0 | 10.0 | — | 7 | 9.6 | >2.4 | .5 | .4 | .2 | >7.8 |
| E/CO Copolymer | 0 | 10.0 | — | 8.2 | 10.3 | >4.1 | .1 | .8 | .5 | >8.2 |
| E/CO/AA Terpolymer | 10.0 | 5.0 | — | 4.1 | 7.1 | 1.5 | >24.2 | 24.9 | 6.9 | DNR |
| E/CO/VA Terpolymer | — | 10.0 | 10.0 | 35.2 | 8.2 | 6.1 | 8.8 | 2.0 | 1.33 | DNR |

> indicates cohesive failure strength of film substrate
A[1] 6 mil (0.15 mm) SARAN PVDC film
B[2] 2 mil (0.051 mm) SARAN PVDC film
[3]Nylon-6 film
[4]Aluminum
[5]ethylene/vinyl alcohol copolymer, molded 20 mil (0.51 mm) plaque
[6]2 mil (0.051 mm) polycarbonate cast film

EXAMPLE 4

In order to compare an ethylene/carbon monoxide copolymer (10% CO by weight, 18.7 M.I.) with an ethylene/carbon monoxide/acrylic acid terpolymer (10% CO and 5% AA by weight, 12.8 M.I.), a 2-mil thick coating of each is extrusion-coated onto various substrates and adhesion (lb./in.) is measured. In Table IV below, Sample A is the E/CO copolymer and is extrusion-coated at about 300° C.; Sample B is the E/CO/AA terpolymer and is extrusion-coated at about 290° C.; PVDC means polyvinylidene chloride; EVAL means ethylene/vinyl alcohol copolymer; LLDPE means linear low density polyethylene; LDPE means low density polyethylene; PET means polyethylene terephthalate; OPP means oriented polypropylene.

TABLE IV

| SAMPLE | PDVC | PET | POLYAMIDE | OPP | ALUMINUM | LDPE | LLDPE |
|---|---|---|---|---|---|---|---|
| A | >5* | 0.5 | 0.32 | <0.05 | 0.14 | 0.3 | 0.07 |
| B | >5* | 1.6 | 2.44 | 0.05 | 2.5 | 0.5 | 0.5 |

*All > samples resulted in film failure, not adhesive failure. The above illustrates the superior adhesiveness of E/CO/AA terpolymers as compared to E/CO copolymers.

EXAMPLE 5

The packaging industry utilizes a number of barrier resins, such as in Table V below, and the E/CO/acid terpolymers are found to make good adhesives for making laminates which contain one or more barrier layers.

TABLE V

| Nominal Value* | Oxygen Barrier Resistance Polymer |
|---|---|
| 0.03–0.30 | ethylene/vinyl alcohol copolymers; EVAL |
| 0.05–0.20 | polymers or copolymers based in vinyl chloride and/or vinylidene chloride monomers; SARAN polymers |
| 2 | polyvinyl chloride, PVC |
| 80 | plasticized PVC |
| 4 | PET, polyethylene terephthalate |
| 10 | nylon, polyamide |
| 125 | HDPE, high density polyethylene |

*cm³ of O$_2$ as measured by ASTM D-1434

EXAMPLE 6

It has been determined that E/CO/acid terpolymers are useful as heat-plastified adhesives between layers of similar plastics or resins, layers of dissimilar plastics or resins, and/or between layers of plastics or resins and completely different substrates, such as paper, cloth, metal, glass, vitreous material, wood, leather. These terpolymers are also useful as heat-plastified adhesives between layers of materials, neither layer being plastic or resin, such as the materials named immediately above.

In the presently claimed invention, means are provided for using RF or MW energy to seal, e.g., open-mouth pinch-type bags or valve bags. Ordinarily, multi-wall paper/polyethylene pinch top or pinch-valve bags are sewn or are thermally sealed, if they are sealed at all, by externally-applied heat, or may be glued in some instances.

The presently claimed invention requires the incorporation of a high frequency (RF) dielectrically active polymer (such as ECO, E/AA/CO, PVC, nylons, high EVA) into the structure. The bag can then be sealed by subjecting the bag to a high frequency electrical field while applying pressure. The RF active polymer can be in a film form (monolayer or coex structure) or applied as a coating or hot melt to a specific area of a substrate (paper or polymer film or coating). Preferably the RF-sealable polymer is a carbon monoxide-containing polymer, such as E/CO, E/CO/VA, E/CO/AA, or E/CO/MAA which provides RF-sealability and MW-sealability also. Normally, bags up to about 100-lb. (~45 kg) capacity are employed, especially bags having a capacity in the range of about 25–100 lbs.

Open-mouth multiwall bags are sometimes thermally sealed using heated bars or belts or rollers to melt and seal an inside polymer liner or coating. This requires several seconds (>10) to be able to achieve a good seal. In thick sections (gusset areas), it is difficult to get even, uniform seals since heat needs to be conducted through the structure. The only way to increase sealing speeds is to increase the temperature of the sealing element. However, this temperature is limited by the degradation temperature or melting temperature of the outside substrate. Paper in the structure is likely to burn if it is heated above 450° F. (232° C.). Even at lower temperatures, it usually dries out and looses strength. Sealers are typically operated at about 350° F. (177° C.) or less when using multiwall paper laminates.

When a dielectrically active polymer is used in the structure and it is subjected to high frequency electrical field, the active polymer heats internally via molecular friction caused by the polymer's dipole coupling.

Since the heat is internally generated in the polymer, heat transfer is not the limiting problem. In fact, the problem that must be addressed is heat loss from the active polymer. If enough heat can be generated in the polymer to overcome the heat losses, the polymer can be melted very rapidly (usually in less than five seconds) and a good seal is achieved. In a multiwall bag, the other layers of paper and polyethylene, in this invention, actually serve as thermal insulation which reduces heat losses from the active inner sealing layer. The moisture in the paper, in fact, will also couple with the electric field somewhat and also heat up. This also aids in faster sealing since it reduces heat losses.

A special type of bag that is used to hold many products is called a valve bag. The bag is made entirely closed except for a valve opening. The bag is filled through the valve and when filled and flattened, the product in the bag provides the pressure against the valve to close it. However, with some products, especially powders, some sifting usually occurs. Another problem with this design is that it is susceptible to pilfering. Some users have employed tape labels or have tried a variety of techniques to seal the valve closed; this includes ultrasonic, inductive heated bar, steam, hot air, and pressure-applied adhesives. Most of these methods have not proven entirely successful. They are labor intensive and can add significant cost to the package.

Our presently claimed invention requires that an RF active material be used in the valve construction. One way to achieve this is to bond a sleeve or tube of the active material into the valve area. The bag is filled through this sleeve. After the bag is filled and flattened so there is internal pressure holding the valve closed, the valve can be sealed by exposing it to a high frequency electrical field. This can be accomplished by passing the bag past a stray field electrode that is used when shallow penetration is desirable. The seal that is achieved prevents sifting and requires no manual operation, thereby being very cost effective.

EXAMPLE 7

A multiwall bag (2 plys paper/P.E./2 plys paper) was modified by inserting a tube of RF-active polymer into the center of the bag in the seal area. The bag was then subjected to a 1.5 KW Callanan approx. 30 MHz sealer. A 12"×3/32" (30.5 cm×2.38 mm) brass bar was used as the sealing electrode. After three seconds exposure to the electric field, the inside tube had sealed hermetically. The RF-active polymer used was ECO (10% CO) and the bag was a paper/polyethylene laminate used for packaging caustic pellets. A second test was made in the same manner except the RF-active polymer was E/AA/CO (5% AA, 10% CO) and it also gave a successful seal.

For comparison, a bag, without the CO-containing polymer, was sealed with a hot bar sealer at a sealing temperature of 450° F. (213° C.) for 12 seconds and the seal was not as good as with the ECO polymer.

EXAMPLE 8

A multiwall caustic bag was made using a 5 mil inside film of ECO (10% CO). The bag was successfully sealed in less than 2 seconds using a Thermatron 6 KW KF 62/SP40 generator and press. The sealed bag demonstrated uniform strength across the width of the bag even in the gusset areas.

EXAMPLE 9

A multiwall paper/polyethylene/paper valve bag was made using a 13.3 cm layflat blown tube, 0.038 mm thick, of 10% ECO. The ECO tube was bonded to the paper/poly bag using a commercially available hot melt. For demonstration purposes the bag was cut across its width so only the top portion of the bag which had the valve incorporated in it was used. This top portion at the valve was erected and placed on top of a stray field electrode (RADIO FREQUENCY CORPORATION 747) that was coupled to a 10 KW 40 MHz generator. A flat piece of teflon was placed against the top of the bag and a 567 g teflon block was placed on top. The generator was turned on and the top of the bag was pulled over the electrode to approximate a ten second exposure to RF energy. The bag, when removed, had its valve completely fused together.

We claim:

1. A method for filling and sealing a container of multiwall construction, said container being closed except for a pinch-valve, comprising
   introducing product into the container through the pinch-valve via a filling spout,
   removing the filling spout from the pinch-valve, allowing the valve to close, and
   sealing the valve closed by subjecting the valve to the RF energy of a stray current or stray field electrode,
   wherein the material from which the valve is made contains at least one RF-sealable polymer of the group consisting of carbon monoxide-containing ethylene polymers.

2. The method of claim 1 wherein the RF energy is in the microwave range.

3. The method of claim 1 wherein the RF energy is in the range of about 30 MHz to about 10,000 MHz.

4. The method of claim 1 wherein the RF energy is above about 100 MHz.

5. The method of claim 1 wherein the RF-sealable polymer comprises at least one of the group consisting of ECO, ECOAA, ECOVA, and ECOMAA.

6. The method of claim 1 wherein the RF-sealable polymer comprises ECO.

7. The method of claim 1 wherein the RF-sealable polymer comprises ECOAA.

8. The method of claim 1 wherein the RF-sealable polymer comprises ECOVA.

9. The method of claim 1 wherein the RF-sealable polymer comprises ECOMAA.

10. A method for filling and sealing a container of multiwall construction, said container being closed except for a filling-opening, comprising
    introducing product into the container through the filling-opening,
    closing the filling-opening and sealing it closed by subjecting it to the RF energy of a stray current or stray field electrode,
    wherein the material from which the filling-opening is made contains at least one RF-sealable polymer of the group consisting of carbon monoxide-containing ethylene polymers.

11. The method of claim 10 wherein the RF energy is in the microwave range.

12. The method of claim 10 wherein the RF energy is in the range of 30 MHz to 10,000 MHz.

13. The method of claim 10 wherein the RF energy is above about 100 MHz.

14. The method of claim 10 wherein the RF-sealable polymer comprises at least one of the group consisting of ECO, ECOAA, ECOVA, and ECOMAA.

15. The method of claim 10 wherein the RF-sealable polymer comprises ECO.

16. The method of claim 10 wherein the RF-sealable polymer comprises ECOAA.

17. The method of claim 10 wherein the RF-sealable polymer comprises ECOVA.

18. The method of claim 10 wherein the RF-sealable polymer comprises ECOMAA.

* * * * *

UNITED STATES PATENT AND TRADEMARK OFFICE
CERTIFICATE OF CORRECTION

PATENT NO. : 4,787,194

DATED : November 29, 1988

INVENTOR(S) : Gerald M. Lancaster and David C. Kelley

It is certified that error appears in the above-identified patent and that said Letters Patent is hereby corrected as shown below:

Col. 4, line 7; change "of" to --or--. (2nd occurrence)

Col. 4, line 47; change "$\beta$" to --$\delta$--.

Col. 4, line 52; change "$\beta$" to --$\delta$--.

Col. 4, line 55; change "$\beta$" to --$\delta$--.

Col. 11, line 22; delete the period "." after "used".

Signed and Sealed this

Twenty-first Day of August, 1990

Attest:

HARRY F. MANBECK, JR.

Attesting Officer

Commissioner of Patents and Trademarks